United States Patent [19]

Amemiya et al.

[11] Patent Number: 5,110,279
[45] Date of Patent: May 5, 1992

[54] INJECTION MOLDING APPARATUS

[75] Inventors: Hideo Amemiya, Yokohama; Minoru Kuroda, Urawa; Tomio Nitta, Yokohama, all of Japan

[73] Assignee: Mitsui Toatsu Chemicals, Inc., Tokyo, Japan

[21] Appl. No.: 517,721

[22] Filed: May 2, 1990

[30] Foreign Application Priority Data

May 12, 1989 [JP] Japan .................. 1-117287

[51] Int. Cl.$^5$ .......................... B29B 7/42; B29C 45/60
[52] U.S. Cl. ...................................... 425/208; 366/79; 366/89; 425/209; 425/542
[58] Field of Search ................ 366/79, 88, 89, 90, 366/318; 425/207, 208, 209, 376.1, 542, 543

[56] References Cited

U.S. PATENT DOCUMENTS

| 3,596,320 | 8/1971 | Manning | 425/200 |
| 3,602,950 | 9/1971 | Bielfeldt | 425/543 |
| 4,648,827 | 3/1987 | Laimer et al. | 425/208 |

FOREIGN PATENT DOCUMENTS

| 1432146 | 2/1966 | France | 425/208 |
| 55-288867 | 2/1980 | Japan | 425/208 |

Primary Examiner—Jay H. Woo
Assistant Examiner—James P. Mackey
Attorney, Agent, or Firm—Burns, Doane, Swecker & Mathis

[57] ABSTRACT

There is provided an injection molding apparatus of the screw in-line type which has a screw having the following structural features and is used for injection-molding a high-nitryl resin.

(1) A compression ratio is set to a value of 1.8 to 2.5.
(2) Ratios of the lengths of the feed section, the compression section, and the metering section are set to

[1 to 1.5]:[1.8 to 2.8]:[1].

(3) A depth T (unit:mm) of groove of the metering section in relation to an inner diameter D (unit:mm) of the cylinder is set to $T \geq 0.057D - 0.2$.

(4) A radius of curvature R (unit:mm) of the arc surface of the rear side corner portion which is formed between a screw shaft and a flight in relation to the inner diameter D (unit:mm) of the cylinder is set to $R \geq 0.36D + 2.0$.

3 Claims, 2 Drawing Sheets

INJECTION MOLDING APPARATUS

TECHNICAL FIELD

The present invention relates to an injection molding apparatus for high-nitryl resin and, more particularly, to an injection molding apparatus for high-nitryl resin which can provide an excellent quality stability of a long time, for products obtained from the molding.

BACKGROUND ART

Since a high-nitryl resin is excellent in chemical resistance and gas barrier properties it is used as a container material of cosmetics, stationery, chemicals, foods, or the like.

Hitherto, those containers have mainly been formed by extrusion molding or blow molding. However, in recent years, they have also been manufactured by injection molding.

However, since a high-nitryl resin contains a large quantity of nitryl compound, its heat stability is inferior to that of a general resin such as polyolefin or the like. On the other hand, since the melt viscosity is high, if a high nitryl resin is melt kneaded upon molding, heat is easily generated.

In the case of injection molding a resin having such characteristics, generally, a screw of a low compression, a gentle compression, and a deep groove is considered to be suitable. In the case of a high-nitryl resin, in order to prevent the heat generation of the melted resin, a screw of a low compression, a gentle compression, and a deep groove in which a compression ratio is set to about 1.8 to 2.5 and length distribution ratios of the feed section, compression section, and metering section are set to about [1 to 1.5 ]:[1.8 to 2.8]:[1 ]can be preferably used only in the molding of a relatively short time.

However, even in such a screw, there is a problem such that if the molding is continued for a long time, a yellowing occurs in the molded article and a good product cannot be obtained.

DISCLOSURE OF THE INVENTION

It is an object of the invention to provide an injection molding apparatus for high-nitryl resin which can execute the molding for a long time and can solve the foregoing problems.

The present inventors have studied and examined to accomplish the above object and as a result, they have found out that a good result can be obtained by using a screw of a deep groove, a low compression, and a gentle compression as mentioned above wherein a radius of curvature of an arc surface of a rear side corner portion which is formed between a screw shaft and a flight is set to a predetermined large value or more, so that the present invention has been made.

The present invention provides an injection molding apparatus of a screw in-line type for injection molding a high-nitryl resin, wherein a screw of the following type is used.

(1) Compression ratio: 1.8 to 2.5

(2) Ratios of the lengths of the feed section, compression section, and metering section are set to

[1to 1.5]:[1.8 to 2.8]:[1]

(3) A depth T (unit: mm) of groove of the metering section in relation to an inner diameter D (unit: mm) of a cylinder is set to $T \geq 0.057D - 0.2$ (4) A radius of curvature R (unit: mm) of the arc surface of the rear side corner portion which is formed between the screw shaft and the flight in relation to the inner diameter D (unit: mm) of the cylinder is set to $R \geq 0.36D + 2.0$ According to the injection molding apparatus of the invention including the screw with the construction as mentioned above, a high-nitryl resin can be stably molded for a long time and excellent molded articles can be efficiently produced without causing the yellowing or the like.

A high-nitryl resin which is molded by the injection molding apparatus according to the invention is a copolymer mainly comprising an unsaturated nitryl compound such as acrylonitrile, metacrylonitrile or the like and contains 50 weight % or more, preferably, 55 weight % or more of an unsaturated nitryl compound unit.

An unsaturated compound which can be copolymerized with a nitryl compound can be used as comonomer. For example, an unsaturated aromatic compound, a diene compound, an unsaturated ester compound, an unsaturated ether compound, etc. can be employed as such an unsaturated compound. More particularly, there can be utilized styrene, α-methylstyrene, butadiene, isoprene, methylacrylate, ethylacrylate, methylmetacrylate, ethylmetacrylate, etc. and one or more kinds of them may be copolymerized with an unsaturated nitryl compound.

On the other hand, rubber-like copolymer of a butadiene-acrylonitrile copolymer, a butadiene-styrene copolymer, an isoprene-styrene copolymer, and a polybutadiene, polyisoprene, or the like are mixed with a copolymer mentioned above, so as to form the above mentioned unsaturated nitryl unit and the resultant copolymer may be used as a high-nitryl resin. Under the existence of those rubber-like copolymers, a mixture of an unsaturated nitryl compound and the above comonomer is copolymerized and the resultant copolymer can be also used. Those copolymers are preferable since they possess impact resistance properties.

Further, it is also possible to use a high-nitryl resin mixed with a rubber like copolymer as mentioned above. That is, a copolymer of an unsaturated nitryl compound with said comonomer is formed to a matrix and a mixture with such a rubber-like copolymer can be used as a high-nitryl resin, said rubber-like copolymer having a graft portion of composition similar to such a matrix or a graft portion having a compatibility with such a matrix.

An oxidation inhibitor, an ultraviolet absorbent, an antistatic agent, a lubricant, an inorganic filler, a color pigment, or the like or a small amount of other resin can be also contained in those high-nitryl resins.

BRIEF DESCRIPTION OF THE DRAWINGS

In FIG. 1, reference numeral 1 denotes a screw; 2 indicates a cylinder; 3 a piston which is attached between a screw drive shaft 4 and the screw 1 and adapted to send a resin with pressure; 5 a piston which is attached to one end of the screw drive shaft 4 and is used to forwardly or backwardly move the screw; 6 a motor for rotating the screw; 7 an output shaft of the motor 6; and 8, 9, and 10 gears.

Figure 1:
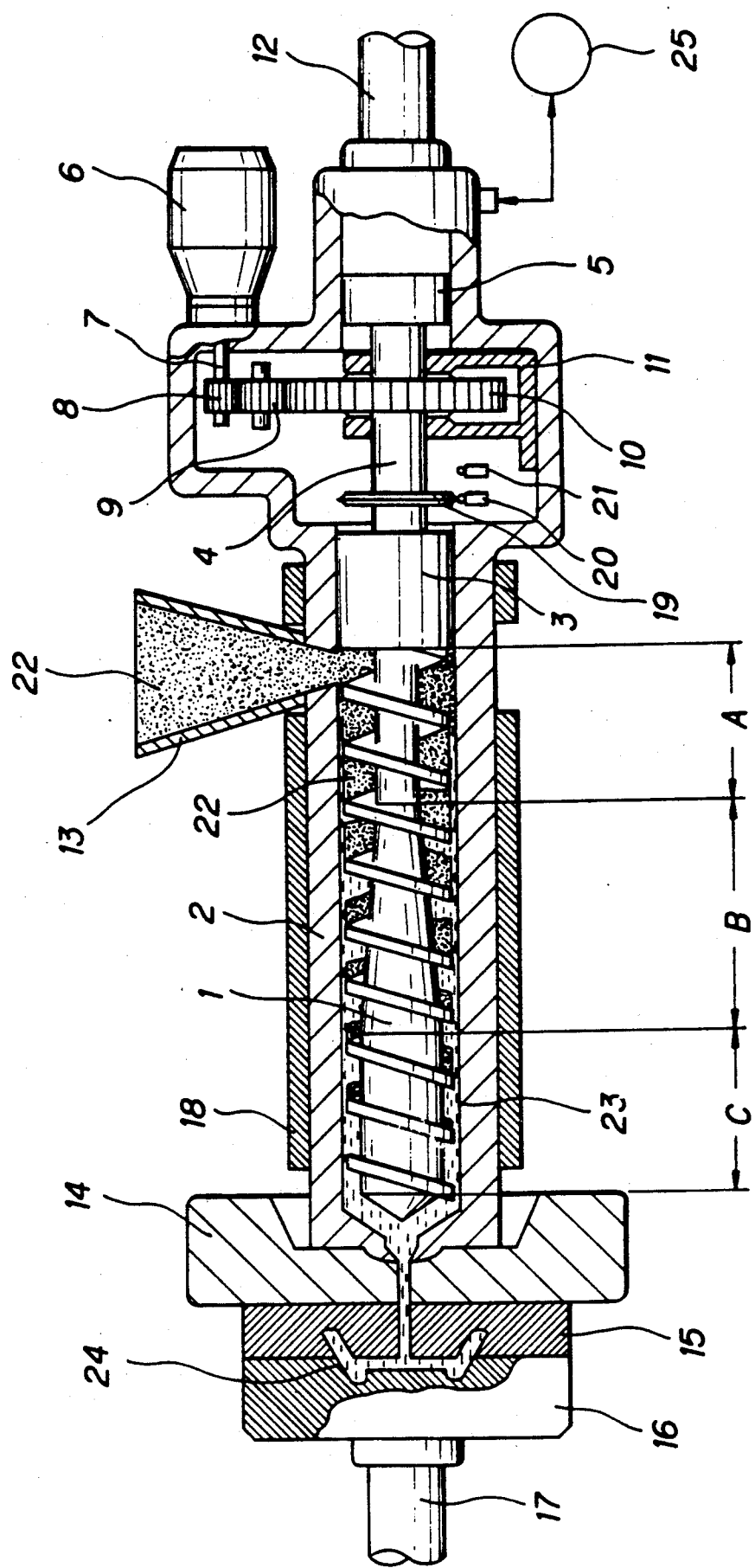
FIG. 1 is a partial sectional view showing the main portion of an injection molding apparatus according to the present invention.

The gear 10 rotates the screw drive shaft 4. However, the gear 10 is attached to the screw drive shaft 4 so as not to prevent the screw drive shaft 4 from moving to the right and left in the drawing, in other words, so as to enable the screw drive shaft 4 to move in its axial direction. The gear 10 is restricted by a member 11 so as not to move in the main shaft direction of the screw drive shaft 4.

Reference numeral 12 denotes a rod of a hydraulic cylinder (not shown). The rod 12 is used to move the cylinder 2 to the right and left in the drawing. Reference numeral 13 denotes a hopper to supply a raw material resin.

Reference numeral 14 denotes an attaching base for a fixed die, and the fixed die 15 is attached to the die attaching base 14.

Reference numeral 16 denotes a movable die. The die 16 is brought into pressure contact with the fixed die 15 by a rod 17 of the hydraulic cylinder (not shown) or is removed from the die 16 to take out a molded article.

Reference numeral 18 denotes a heater for heating the cylinder 2; 19 indicates a cam attached to the screw drive shaft 4; 20 and 21 limit switches; 22 pellets of the raw material resin; 23 a melted resin; 24 a resin which has been injected into the cavity of the die; and 25 a hydraulic equipment for driving the piston 5.

Figure 2:
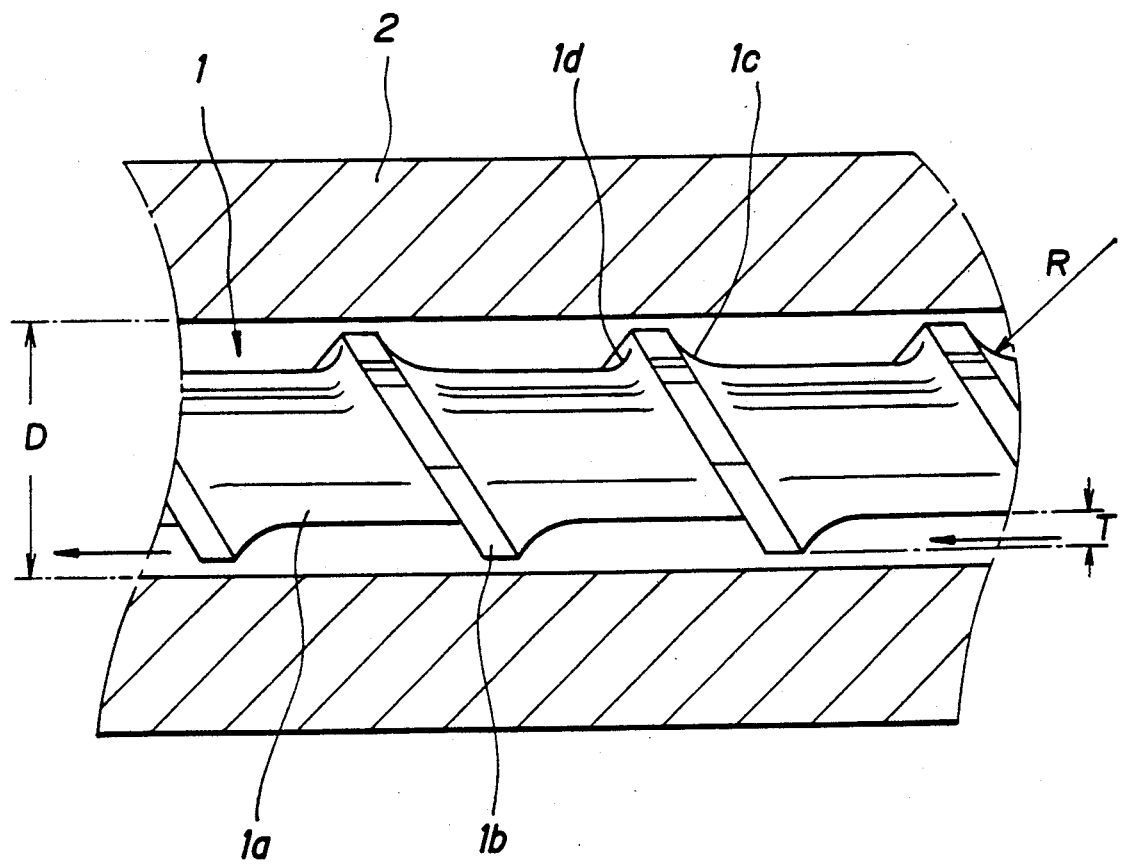
FIG. 2 is a diagrammatical view showing a portion of a screw which is used in the apparatus of FIG. 1.

FIG. 2 is a partial enlarged side elevational view showing the details of a screw for the injection molding apparatus according to the invention.

PREFERRED EMBODIMENT OF THE INVENTION

The details of the present invention will be specifically described hereinbelow with reference to the drawings.

As is well known, the screw 1 comprises: a material feed section A on the hopper side having a constant small boss diameter; a compression section B whose boss diameter gradually increases toward the injection port; and a metering section C whose boss diameter is constant and large and which forms a tip portion of the screw. Since the construction and the operation of the apparatus itself are well known, their descriptions are omitted here.

The present invention concerning the structure of the screw 1 will be described in detail with reference to FIG. 2.

In FIG. 2, reference numeral 1 denotes the screw main body; 1a denotes a screw shaft; 1b a flight; 1c an arc surface of the rear side corner portion which is formed between the screw shaft 1a and the flight 1b; and 1d an arc surface of the front side corner portion which is formed between the screw shaft 1a and the flight 1b.

A radius of curvature of the arc surface 1c of the rear side corner portion of the screw is generally set to a value of 5 to 10 mm in the case of the screw for the injection molding apparatus in which an inner diameter D of the cylinder 2 is set to a value of about 30 to 50 mm.

However, with such a well-known screw, a high-nitryl resin cannot be successfully molded.

A screw which is used in the present invention is constructed in a manner such that a low compression, a gentle compression, and a deep groove are provided for the screw for injection-molding a high-nitryl resin and, further, a radius of curvature R (mm) of the arc surface 1c of the rear side corner portion which is formed between the screw shaft 1a and the flight 1b is set to a value of 0.36D+2.0 or more.

In the case where the radius of curvature R of the arc surface 1c of the rear side corner portion which is formed between the screw shaft 1a and the flight 1b is smaller than a value of 0.36D+2.0 or in the case where a compression ratio is larger than 2.5 even if the curvature R is larger than a value of 0.36D+2.0 or in the case of a high speed compression or the like, the molding stability for a long time is not obtained and the molded article is yellowed.

The arc surface 1c of the rear side corner portion which is formed between the screw shaft 1a and the flight 1b does not need to be set to a complete circular arc surface but it is sufficient to set the arc surface 1c into a shape which is close to a substantial circular arc surface. On the other hand, a radius of curvature of the arc surface 1d of the front side corner portion which is formed between the screw shaft 1a and the flight 1b is not particularly limited.

A check ring to prevent a counter flow of the resin may be also provided for the screw which is used in the apparatus of the invention. However, it is desirable to use a check ring in which a residence portion of the resin does not exist and an opening rate is large.

On the other hand, in order to improve the dispersibility of, for instance, a color pigment or the like, a mixing pin or the like may be also provided for the screw which is used in the invention. Further, hard chromium or the like may be also plated on the screw.

In order to reduce a heat history, it is desirable that a ratio L/D of a length L of cylinder to the inner diameter D is set to a value of about 12 to 22.

Various embodiments of the screw of the injection molding apparatus according to the present invention and practical molded examples which were obtained by using those embodiments will now be described hereinbelow together with comparison examples.

EXAMPLE 1

BAREX 1010N (trademark of products by Mitsui Toatsu Chemicals Inc.) as a high-nitryl resin was injection molded by a molding cycle of about 30 seconds by means of an injection molding apparatus having an injection cylinder, the inner diameter D of which is 36 mm, and a screw having the L/D of 20, the compression ratio of 2.0, the depth T of groove of the metering section of 3 mm, the distribution ratios of the feed section, the compression section, and the metering section of about 1.3:2.3:1, the radius of curvature R of the arc surface of the rear side corner portion which is formed between the screw shaft and the flight is set to 15 mm, and the radius of curvature of the arc surface of the front side corner portion of 3 mm. The time until a yellowed substance is produced was measured.

The result is shown in Table 1.

TABLE 1

| | | Screw shape | | | |
|---|---|---|---|---|---|
| Inner diameter of cylinder D mm | Compression ratio | Ratios of the lengths of the sections | Depth of goove of metering section T mm | R mm of rear side corner portion of flight | Time until a yellowed substance is produced Hr |
| Examples | | | | | |
| 1 | 36 | 2.0 | 1.3:2.3:1 | 3 | 15 | >120 |
| 2 | 36 | 2.0 | 1.3:2.3:1 | 3 | 20 | >120 |
| 3 | 36 | 2.0 | 1.3:2.3:1 | 3 | 25 | >120 |
| 4 | 50 | 2.2 | 1.4:2.5:1 | 4 | 20 | >120 |
| 5 | 50 | 2.2 | 1.4:2.5:1 | 4 | 30 | >120 |
| Comparisons | | | | | |
| 1 | 36 | 2.0 | 1.3:2.3:1 | 3 | 5 | 35 |
| 2 | 36 | 2.0 | 1.3:2.3:1 | 3 | 10 | 42 |
| 3 | 50 | 2.2 | 1.4:2.5:1 | 4 | 10 | 24 |
| 4 | 50 | 3.5 | 1.4:2.5:1 | 4 | 20 | 10 |

EXAMPLES 2 AND 3

The times until a yellowed substance is produced were measured in a manner similar to the Example 1 except that the radius of curvature R of the arc surface of the rear side corner portion which is formed between the screw shaft and the flight in the example 1 was changed to 20 mm in the example 2 and to 25 mm in the example 3 respectively.

The results are shown in Table 1.

Comparisons 1 and 2

The times until a yellowed substance is produced were measured in a manner similar to the example 1 except that the radius of curvature R of the arc surface of the rear side corner portion which is formed between the screw shaft and the flight in the example 1 was changed to 5 mm in the comparison 1 and to 10 mm in the comparison 2.

The results are shown in Table 1.

EXAMPLE 4

BAREX 2090N (trademark of products by Mitsui Toatsu Chemicals Inc.) as a high-nitryl resin was injection-molded in a molding cycle of about 30 seconds by means of an injection molding apparatus an injection cylinder the inner diameter D of which is 50 mm, and a screw having the L/D of 20, the compression ratio is of 2.2, the depth T of groove of the metering section of 4 mm, the distribution ratios of the feed section, the compression section, and the metering section of about 1.4:2.5:1, the radius of curvature R of the arc surface of the rear side corner portion which is formed between the screw shaft and the flight of 20 mm, and the radius of curvature of the arc surface of the front side corner portion of 5 mm. The time until a yellowed substance is produced was measured.

The result is shown in Table 1.

EXAMPLE 5

The time until a yellowed substance is produced was measured in a manner similar to the example 4 except that the radius of curvature R of the arc surface of the rear side corner portion which is formed between the screw shaft and the flight in the example 4 was changed to 30 mm.

The result is shown in Table 1.

Comparison 3

The time until a yellowed substance is produced was measured in a manner similar to the example 4 except that the radius of curvature R of the arc surface of the rear side corner portion which is formed between the screw shaft and the flight in the example 4 was changed to 10 mm.

The result is shown in Table 1.

Comparison 4

The time until a yellowed substance is produced was measured in a manner similar to the example 4 except that the compression ratio in the example 4 was changed to 3.5.

The result is shown in Table 1.

It should be understood that from the above examples and comparisons, the following results are obtained. By using the screw of a form in which (1) the compression ratio is set to a value of 1.8 to 2.5, (2) the ratios of the lengths of the feed section, the compression section, and the metering section are set to [1 to 1.5]:[1.8 to 2.8]:[1], (3) the depth T of groove of the metering section in relation to the inner diameter D of cylinder is set to $$T \geq 0.057D - 0.2, \text{ and}$$

(4) the radius of curvature R of the arc surface of the rear side corner portion which is formed between the screw shaft and the flight in relation to the inner diameter D of cylinder is set to $$R \geq 0.36D + 2.0,$$

the time until a yellowed substance is produced is extremely longer and the stable molding can be executed for a long time as compared with the case of using prior art screws.

INDUSTRIAL APPLICABILITY

As mentioned above, according to the injection molding apparatus of the present invention, in the injection molding for high-nitryl resin, the molding stability for a relatively long time is obtained. Therefore, the productivity is improved by using the injection molding apparatus of the invention. On the other hand, it is also sufficiently possible to mold a colored article such as a white colored article or the like in which a discoloration is easily conspicuous.

What is claimed is:

1. An injection molding apparatus for injection-molding a high-nitryl resin, comprising an injection screw disposed within a cylinder, said injection screw having a material feed section, a metering section and a compression section positioned between the material feed section and the metering section, said injection screw including a screw shaft, a flight extending helically around the screw shaft and forming a groove, and a rear side corner portion defining an arc surface, said rear side corner portion being formed between the screw shaft and the flight, said injection screw being configured such that:

(1) the injection screw possesses a compression ratio of 1.8 to 2.5;

(2) the ratio of the length of the material feed section to the length of the metering section is from 1 to 1.5, and the ratio of the length of the compression section to the length of the metering section is from 1.8 to 2.8;

(3) the depth T of said groove formed in the metering section in relation to an inner diameter D of the cylinder is $$T \geq 0.057D - 0.2 \text{ mm},$$

wherein the units of measurement of T and D are millimeters; and (4) the radius of curvature R of the arc surface of the rear side corner portion in relation to the inner diameter D of the cylinder is $$R \geq 0.36D + 2.0 \text{ mm}.$$

wherein the units of measurement of R and D are millimeters.

2. The injection molding apparatus according to claim 1, wherein said screw has a screw shaft diameter in the material feed section that is constant and a screw shaft diameter in the metering section that is constant, the screw shaft diameter in the metering section being greater than the screw shaft diameter in the material feed section.

3. The injection molding apparatus according to claim 2, wherein said screw in said compression section has a screw shaft diameter that increases from the material feed section toward the metering section.

* * * * *